Feb. 17, 1942. S. J. LINDSKOG 2,273,120
LAWN RENOVATING MACHINE
Filed Nov. 12, 1940 2 Sheets-Sheet 1
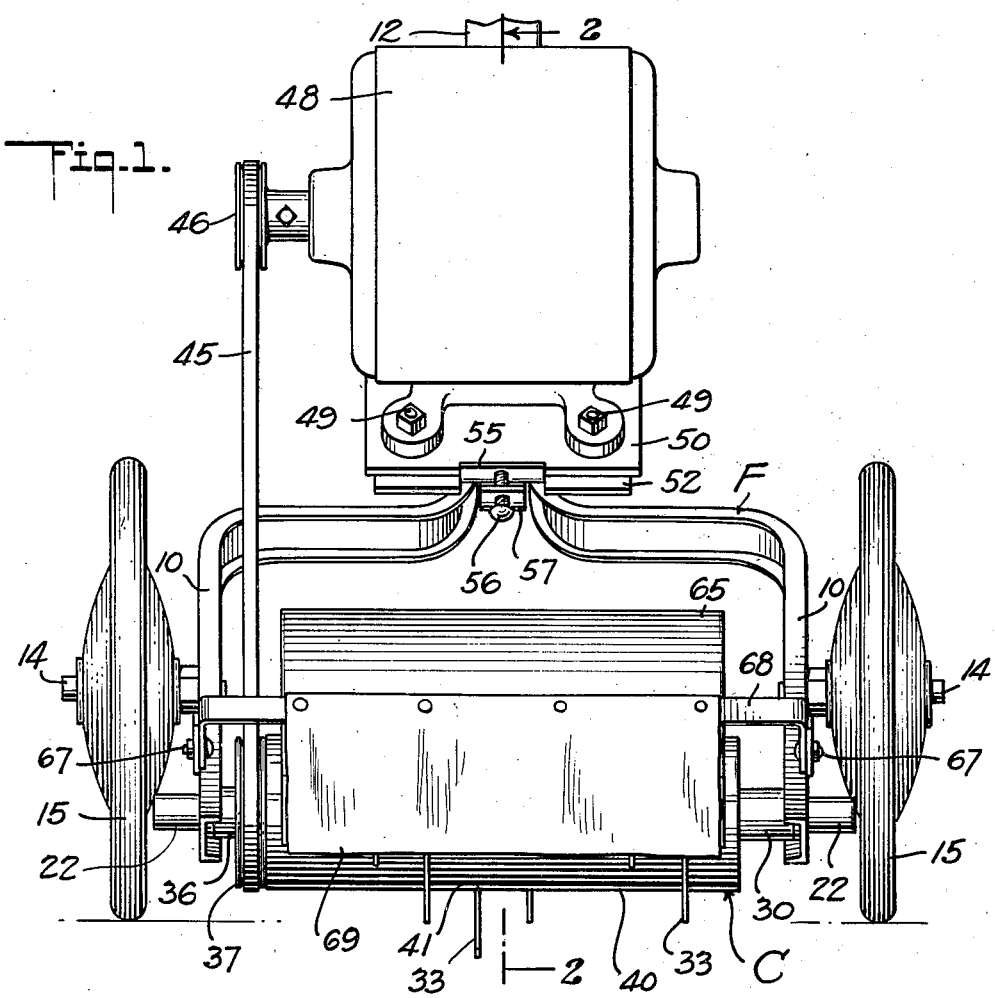
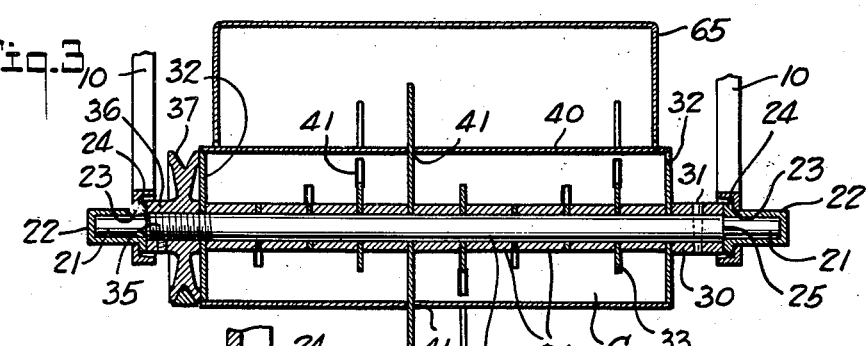
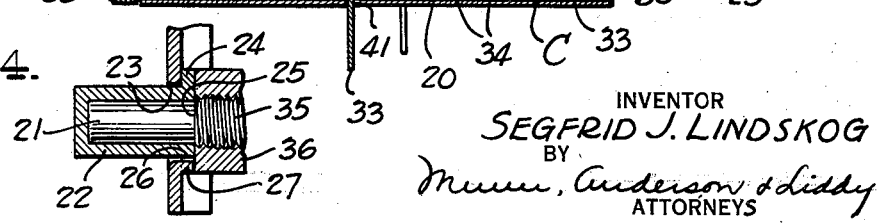
INVENTOR
SEGFRID J. LINDSKOG
BY
Anderson & Liddy
ATTORNEYS

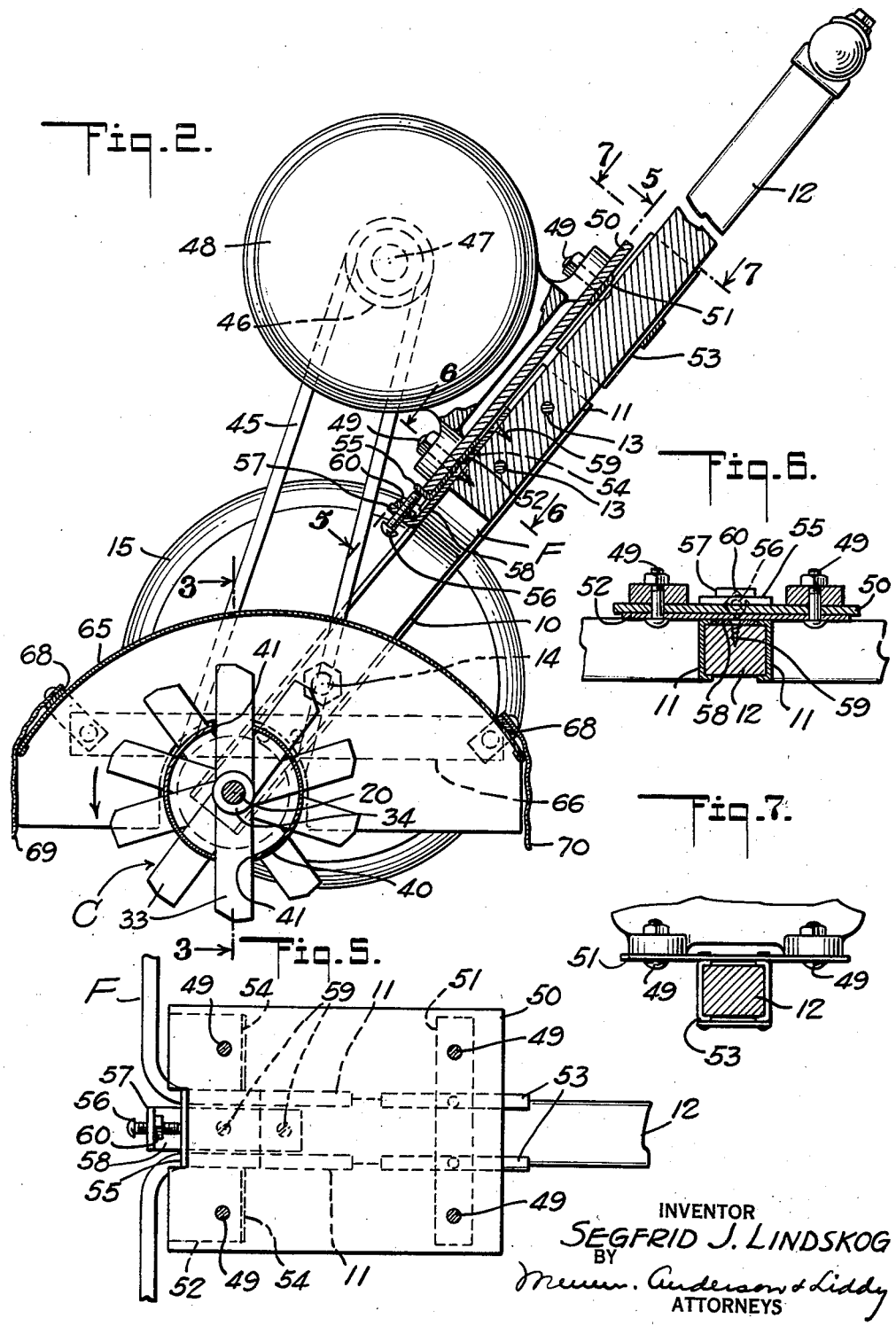

Patented Feb. 17, 1942

2,273,120

UNITED STATES PATENT OFFICE 2,273,120

LAWN RENOVATING MACHINE

Segfrid J. Lindskog, Los Angeles, Calif.

Application November 12, 1940, Serial No. 365,147

4 Claims. (Cl. 97—40)

This invention relates generally to earthworking machinery, and more particularly to lawn renovating machines.

An object of the invention is to provide a machine which is structurally characterized to effectively operate upon Bermuda and other pest grasses having runners or vines which lie close to the ground, by cutting and tearing or uprooting such runners to greatly facilitate the removal thereof by subsequent mowing or raking.

Another object of the invention is to provide a lawn renovating machine which is a self-contained, portable, power-driven unit, easily handled and maneuvered by unskilled labor; which has a self-alining rotary cutting element provided with means for reinforcing the cutting blades thereof and operating as a guard preventing grass runners from winding upon or clogging the element; which is relatively simple in construction and to assemble and disassemble; and which is comparatively inexpensive in cost and operation with practically no maintenance.

With these and other objects in view, the invention resides in the combinations and arrangements of elements as set forth in the following specification, and particularly pointed out in the appended claims.

In the accompanying drawings,

Figure 1 is a view of the lawn renovating machine in front elevation;

Figure 2 is a vertical longitudinal sectional view taken on the line 2—2 of Figure 1;

Figure 3 is a transverse sectional view taken on the line 3—3 of Figure 2;

Figure 4 is an enlarged fragmentary sectional view of the bearing structure for the rotary cutting element;

Figures 5, 6 and 7 are detail sectional views taken, respectively, on the lines 5—5, 6—6 and 7—7 of Figure 2;

Referring specifically to the drawings, the invention comprises a supporting frame F in the form of a yoke composed of two channel section members bent to provide two relatively widely spaced parallel portions 10 and two relatively narrowly spaced portions 11, between which latter a handle 12 is received and clamped by suitable bolts 13, the lateral flanges of the frame overlapping the handle to make a rigid connection between the frame and handle.

Stub axles 14 project from the outer sides of the frame portions 10, and journaled on these axles are wheels 15 which support the machine for rolling movement over the ground.

A cutting element designated generally at C is composed of a shaft 20, the ends of which are reduced in diameter to provide journals 21 rotatably mounted in cup-shaped bearings 22 projecting freely through openings 23 in the frame portions 10 and having flanges 24 abutting the annular shoulders 25 formed on the shaft at the juncture of the journals therewith. The flanges 24 have peripheral slots 26 freely receiving lugs 27 projecting from the frame portions 10 to confine the bearings against rotation and yet permit tilting movement of the bearings in the openings 23 to compensate for any misalignment of the frame.

At one of the journals 21 a stop collar 30 is fixed to the shaft 20 by a diametric pin 31, and abutting this collar is one of two identical disks 32. A number of double ended cutting blades 33 have openings medially between their ends to receive the shaft 20, and are uniformly spaced on the shaft by sleeves 34. At the other of the journals 21, the shaft is threaded as indicated at 35 to receive the internally threaded hub 36 of a driven pulley 37 which is screwed onto the shaft against the other disk 32 and co-acts with the stop collar 30 to rigidly clamp the blades on the shaft.

A blade reinforcing and guard cylinder 40 is of a length to span the disks 32, and of an internal diameter to receive the disks so as to be supported thereby concentrically of the shaft 20 with the ends of the blades projecting through helically arranged slots 41 in the cylinder. The cylinder thus effectively supports the blades 33 in helical formation, and is of sufficiently large diameter to prevent any runners or vines from winding on the cutting element and clogging same or otherwise obstructing its operation.

Trained about the pulley 37 is a belt 45 also trained about a driving pulley 46 fixed to the shaft 47 of an electric motor 48 or other form of prime mover such as an internal combustion engine (not shown).

The motor 48 is secured by bolts 49 to a base plate 50, two of the bolts clamping an attaching bar 51 to the base plate, and the other two bolts clamping a shoe plate 52 to the base plate.

The attaching bar 51 is rigidly secured to the channel section members of a carriage 53 slidably mounted on the handle 12, whereas the shoe plate 52 slides upon the frame portions 11 and is guided against lateral tilting by downturned flanges 54 projecting from the shoe plate for co-action with the outer sides of the frame portions 11.

The central portion of the shoe plate 52 is provided with an upturned abutment flange 55 engaged by a feed screw 56 threaded through an ear 57 on an anchor plate 58 secured by screws 59 to the handle 12. A nut 60 on the screw 56 serves to lock the latter in a selected position of adjustment. The screw 56 co-acts with the flange 55 to bodily adjust the motor along the length of the handle 12 so that the belt 45 can be placed and maintained under proper tension.

A hood 65 overlies the cutting element C and is rigidly supported from the frame F by longitudinally extending bars 66 fixed to the portions 10 of the frame, and secured by bolts 67 to transverse members 68 on the hood, which members also serve to suspend fabric valances 69 and 70 from the hood in advance and at the rear of the cutting element so as to effectively confine the cut grass runners against scattering.

In operation, and with electric current from a suitable domestic source supplied by flexible conductor to the motor 48, the machine is moved over a lawn by an operator holding the handle 12 at an angle approximating the angle shown in Figure 2. The cutting element C is driven at high speed by the motor 48 in the direction indicated by the arrow in Figure 2, and the blades 33 will cut into the soil and through Bermuda grass runners or other creeping vine-like grasses and weeds, and will act to raise or uproot these pest growths for subsequent mowing or raking with ease and dispatch. Any tendency of the runners to wind upon the element C is obviated by the guard cylinder 40 which also positively maintains the helical relationship of the blades 33 and effectively reinforces the blades to preclude breaking of the latter should any excessive lateral stress or resistance to rotation be imposed on the blades.

What is claimed is:

1. In a machine of the class described having a frame provided with relatively widely spaced portions; a cutting element comprising a shaft adapted to be journaled at its ends in said frame portions; a plurality of flat blades having openings intermediate their ends receiving the shaft and providing co-planar portions projecting oppositely from the shaft; means on the shaft co-acting with the blades to space the latter along the length of the shaft; a guard cylinder concentrically mounted on the shaft and having slots through which the outer ends of said blades project to maintain the blades in a predetermined arrangement circumferentially of the shaft and to reinforce the blades; and means for confining the blades against displacement axially of the shaft.

2. In a machine of the class described, having a frame provided with relatively widely spaced portions, a cutting element comprising: a shaft adapted to be journaled at its ends in said frame portions; a plurality of blades having openings receiving the shaft; means on the shaft co-acting with the blades to space the latter along the length of the shaft; a guard cylinder; disks mounted on the shaft and entering the ends of the cylinder to maintain the latter concentrically related to the shaft, the cylinder having slots through which the outer ends of the blades project to maintain a predetermined arrangement of the blades circumferentially of the shaft; and means co-acting with the blade spacing means and with the disks to clamp the blades to the shaft for rotation therewith.

3. In a machine of the class described, having a frame provided with relatively widely spaced portions, a cutting element comprising: a shaft adapted to be journaled at its ends in said frame portions; a plurality of blades having openings receiving the shaft; means on the shaft co-acting with the blades to space the latter along the length of the shaft; a guard cylinder; disks mounted on the shaft and entering the ends of the cylinder to maintain the latter concentrically related to the shaft; the cylinder having slots through which the outer ends of the blades project to maintain a predetermined arrangement of the blades circumferentially of the shaft; a stop collar fixed to the shaft and abutting one of said disks; and means defining a nut threaded on the shaft for co-action with the stop collar, disks and blade spacing means to clamp the blades to the shaft for rotation therewith.

4. In a machine of the class described, a frame having relatively widely spaced portions provided with openings therethrough; bearings tiltably mounted in said openings; means confining the bearings against rotation; a shaft having journals at its ends rotatably mounted in said bearings; cutting blades having openings receiving the shaft; sleeves on the shaft spacing said blades from each other; a guard cylinder; disks on the shaft entering the ends of the cylinder to concentrically relate the latter to the shaft; the cylinder having slots through which the outer ends of the blades project to maintain a predetermined relationship of the blades circumferentially of the shaft; a stop collar fixed to the shaft and abutting one of said disks; and means defining a nut threaded on the shaft and abutting the other disk to clamp the blades to the shaft for rotation therewith.

SEGFRID J. LINDSKOG.